April 11, 1950
T. B. CHACE
2,503,901
FLUID CONTROL SYSTEM PARTICULARLY FOR USE WITH
AUTOMATIC CLOTHES-WASHING MACHINES
Filed Dec. 9, 1943
9 Sheets-Sheet 1
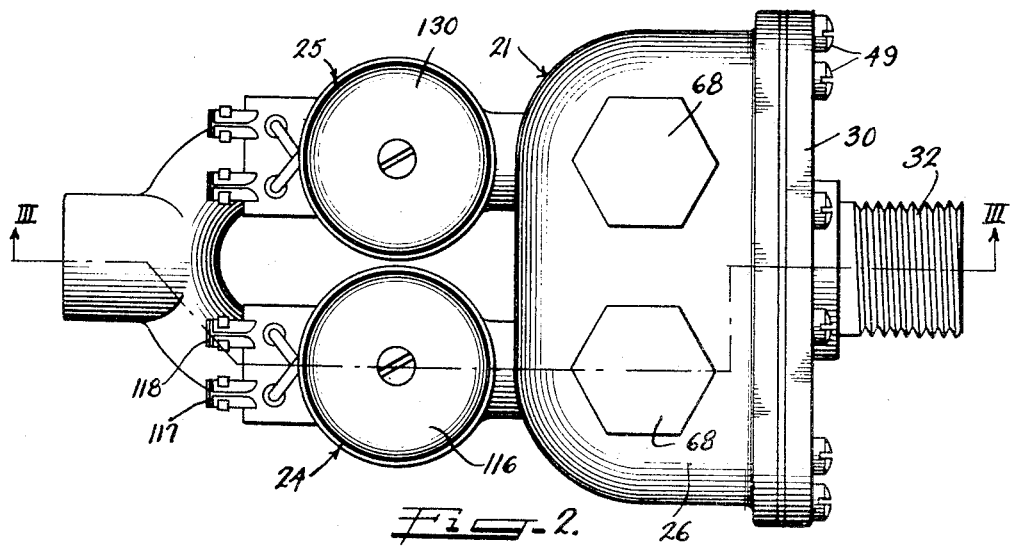
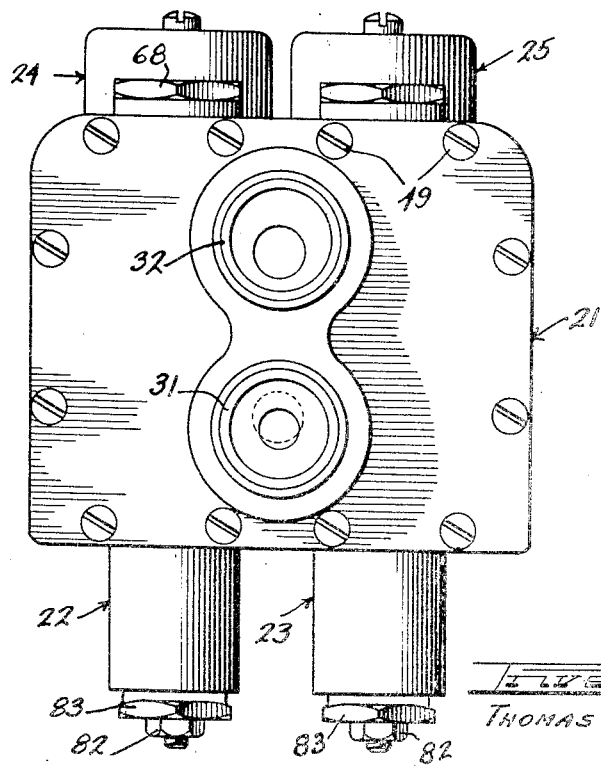
Inventor
Thomas B. Chace.
by Charles W. Hills
Attys.

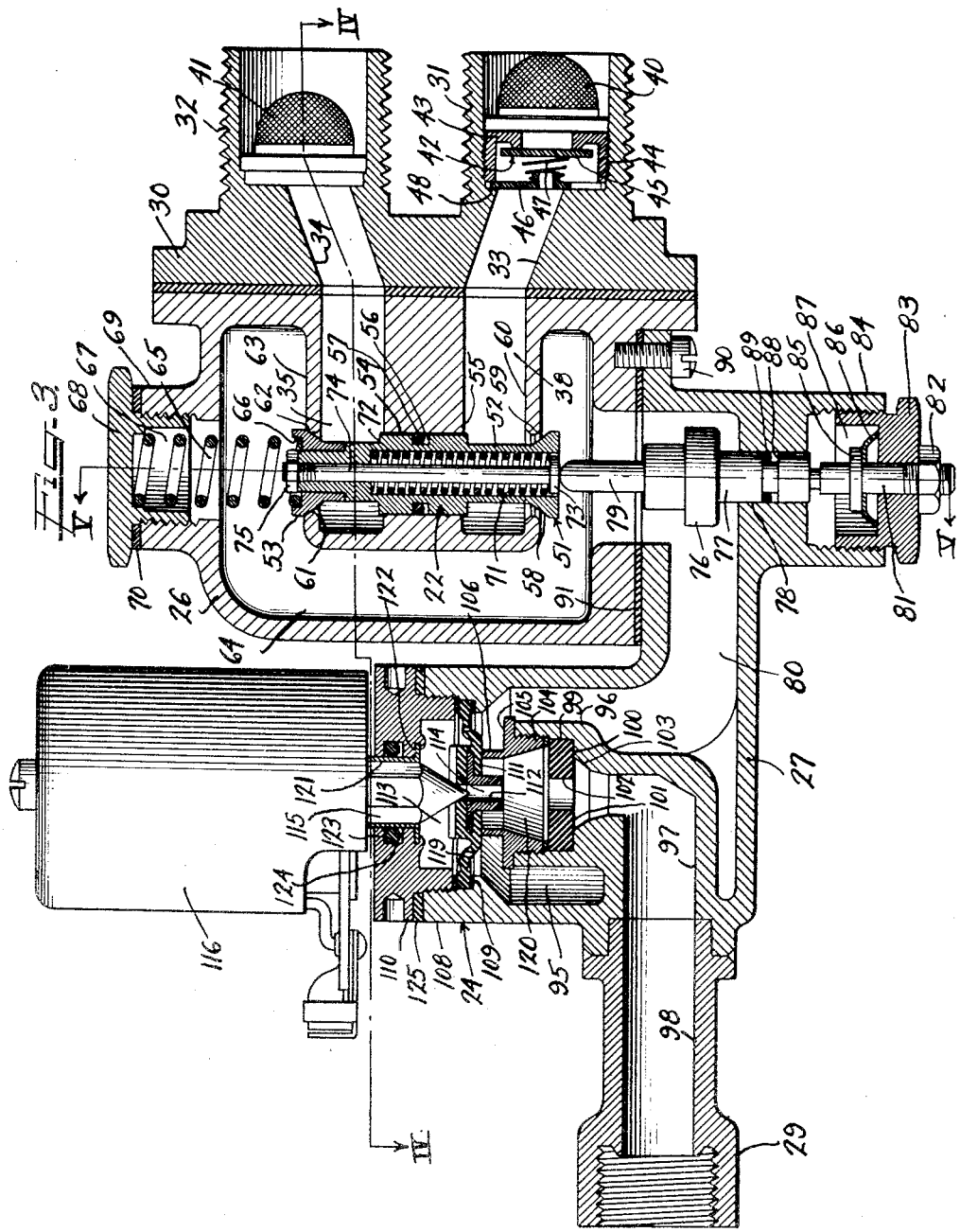

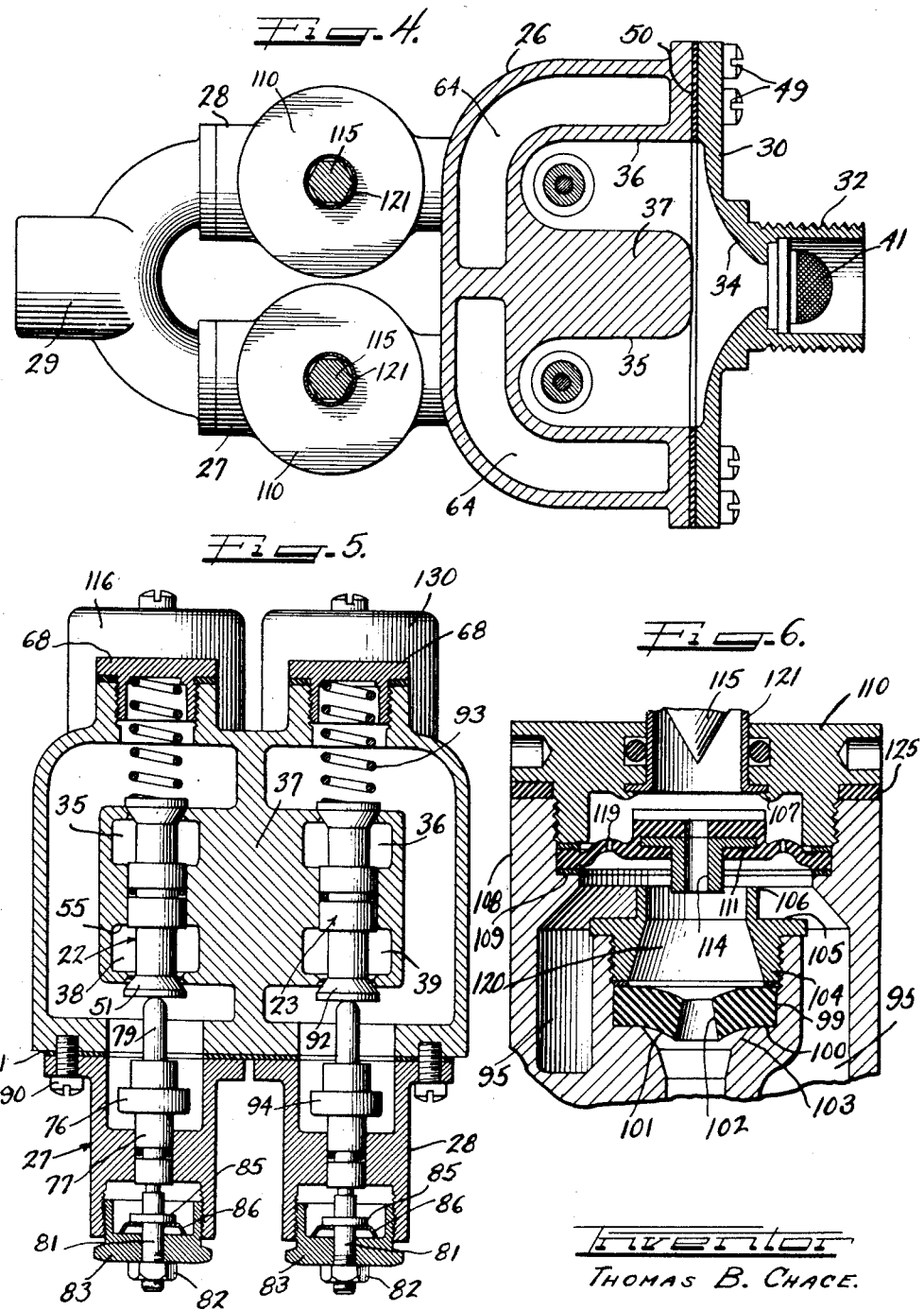

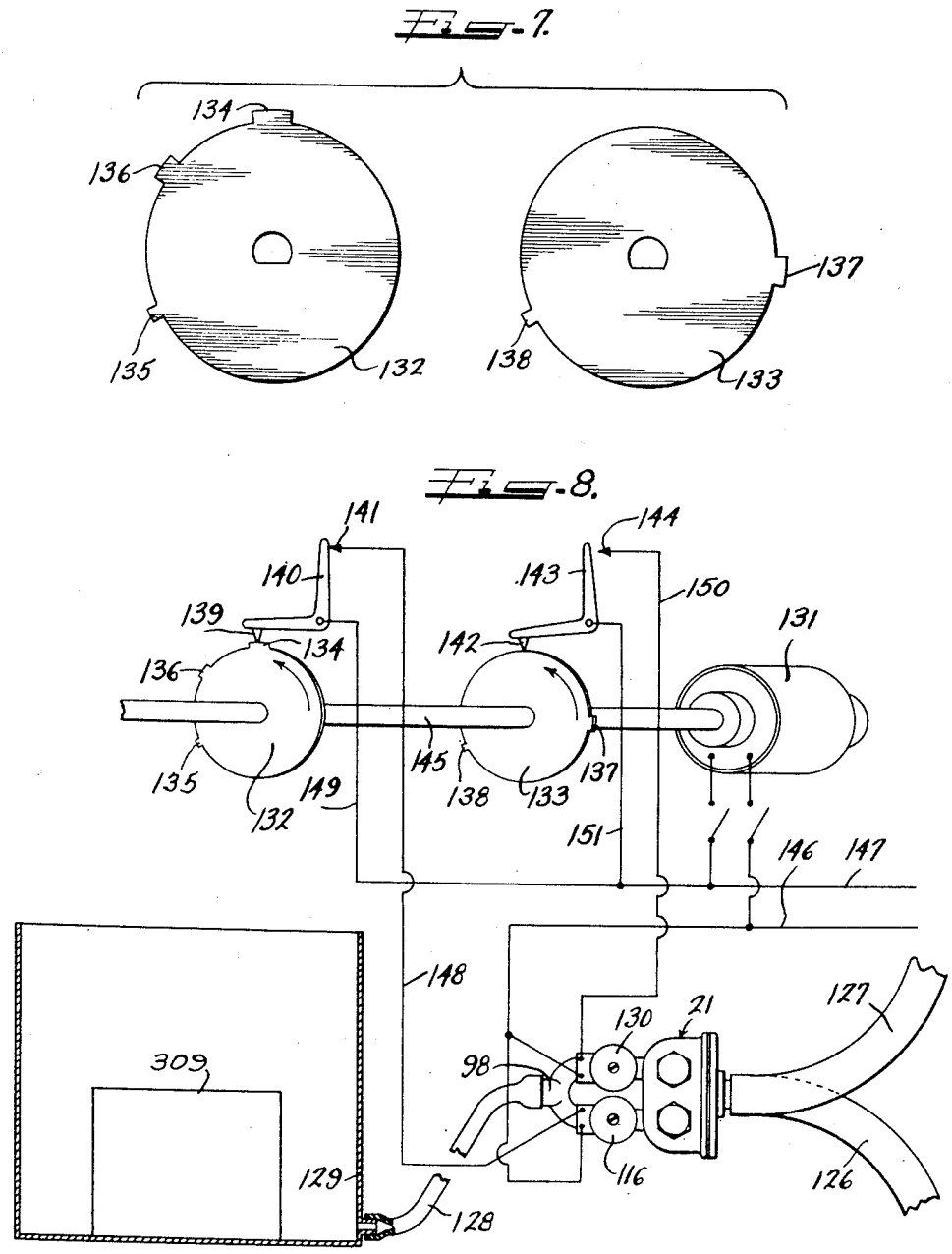

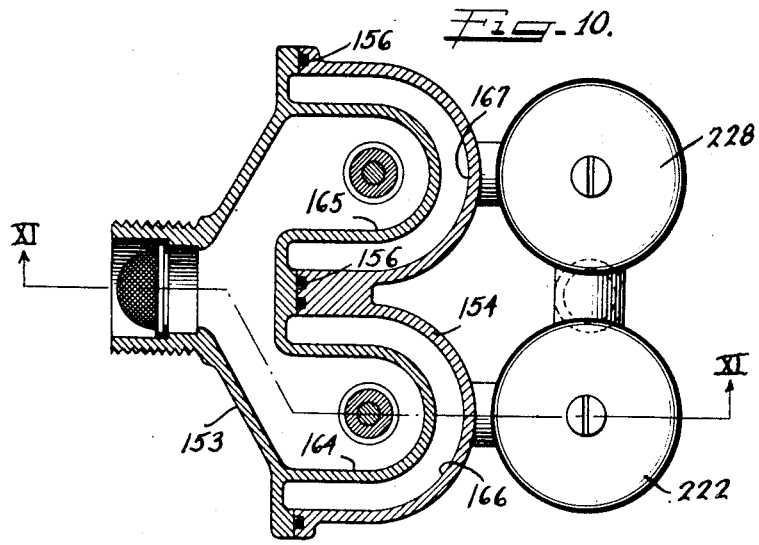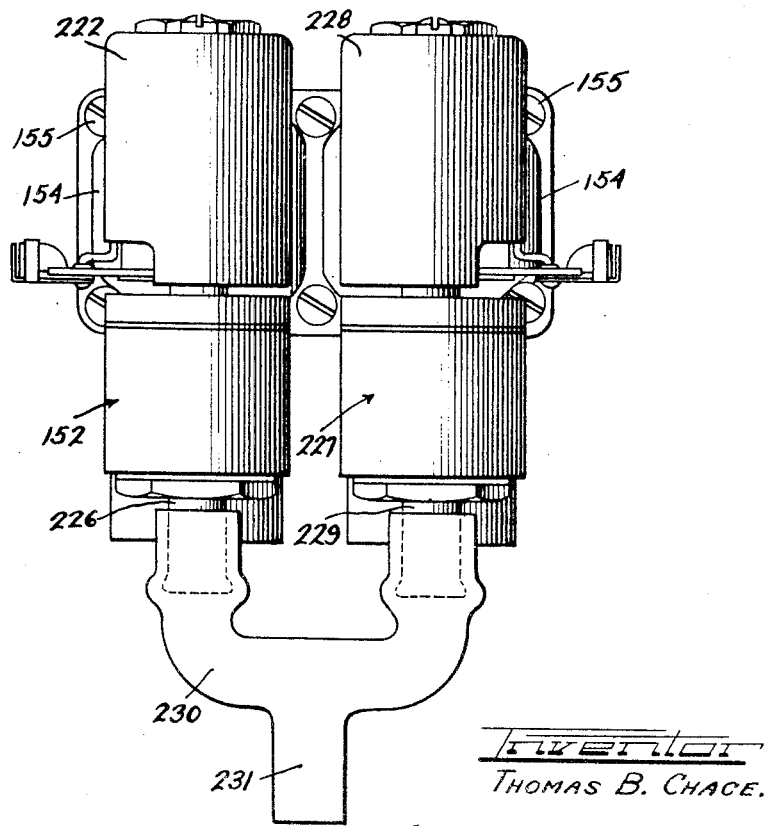

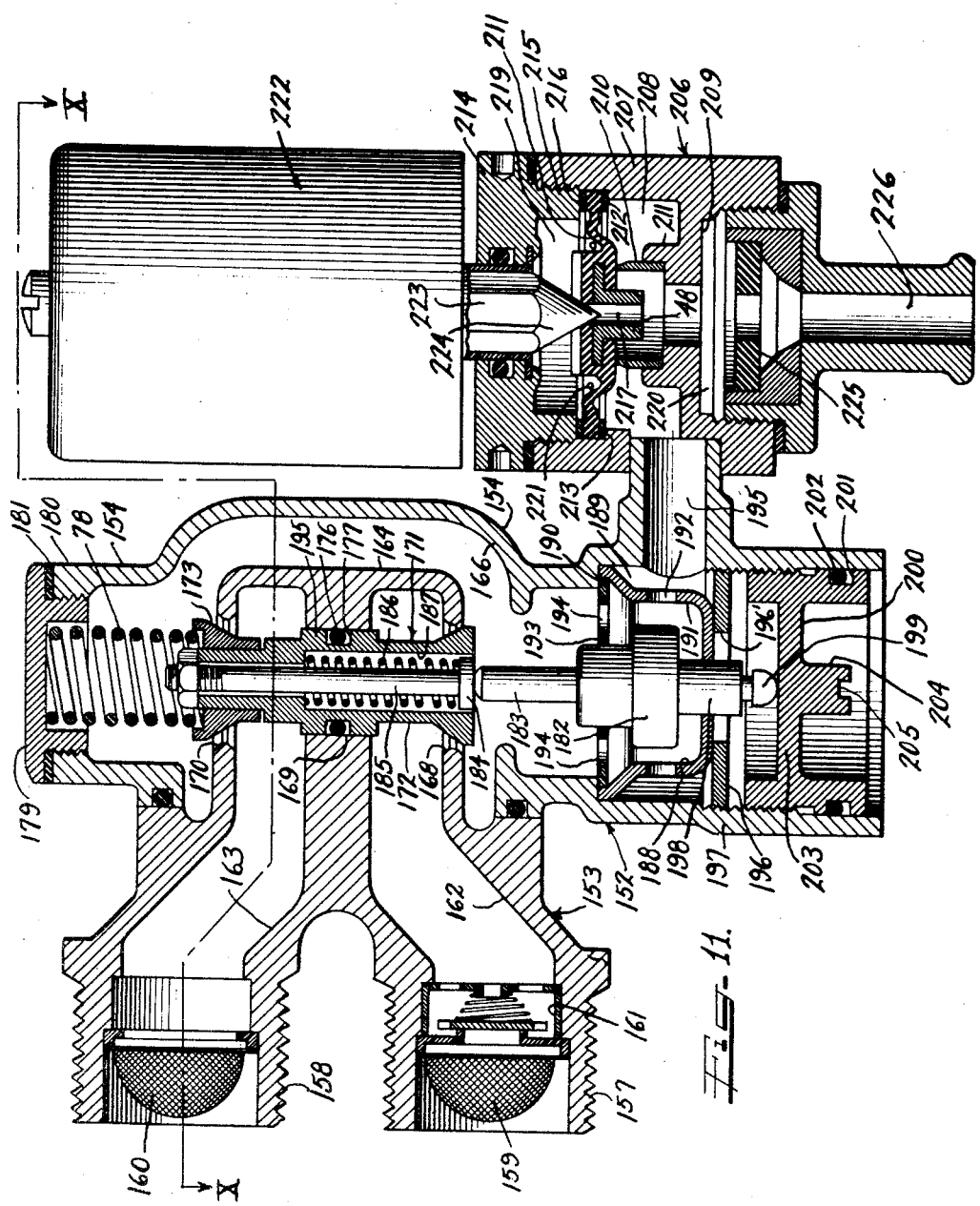

Inventor
Thomas B. Chace.
by Charles W. Hills, Attys.

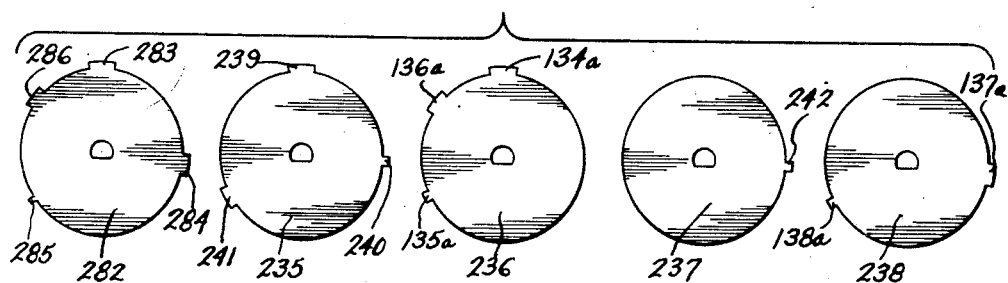
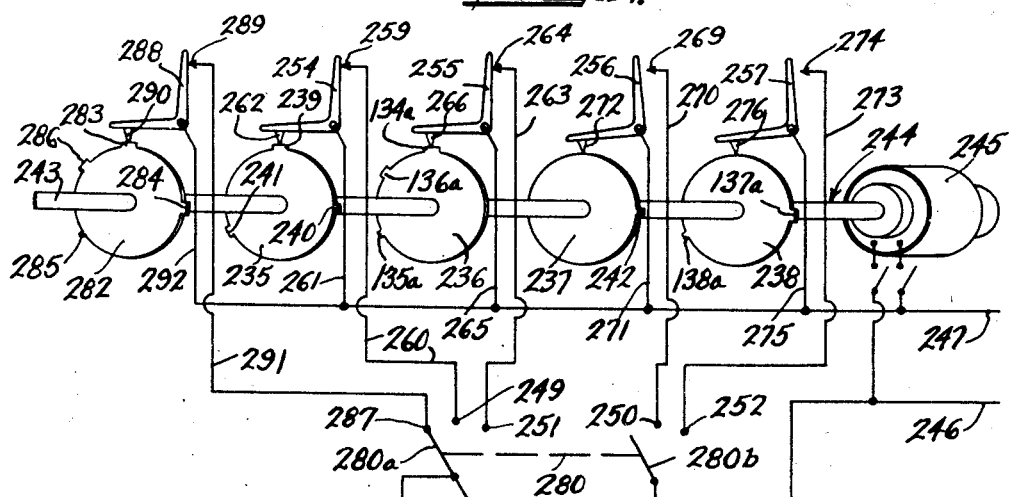
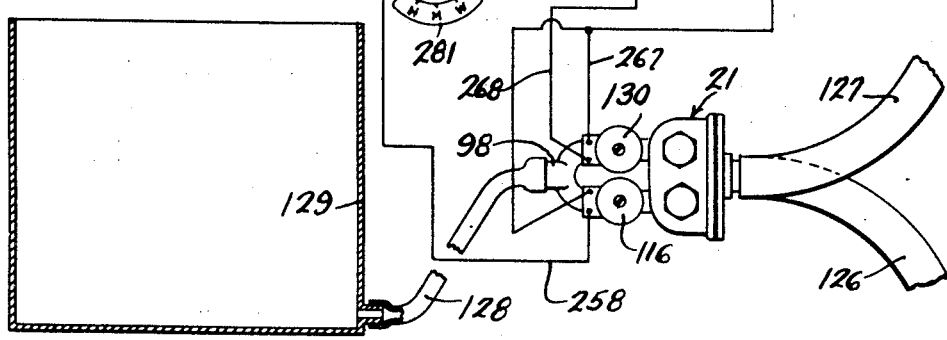
Inventor
Thomas B. Chace.
by Charles W Hills Attys.

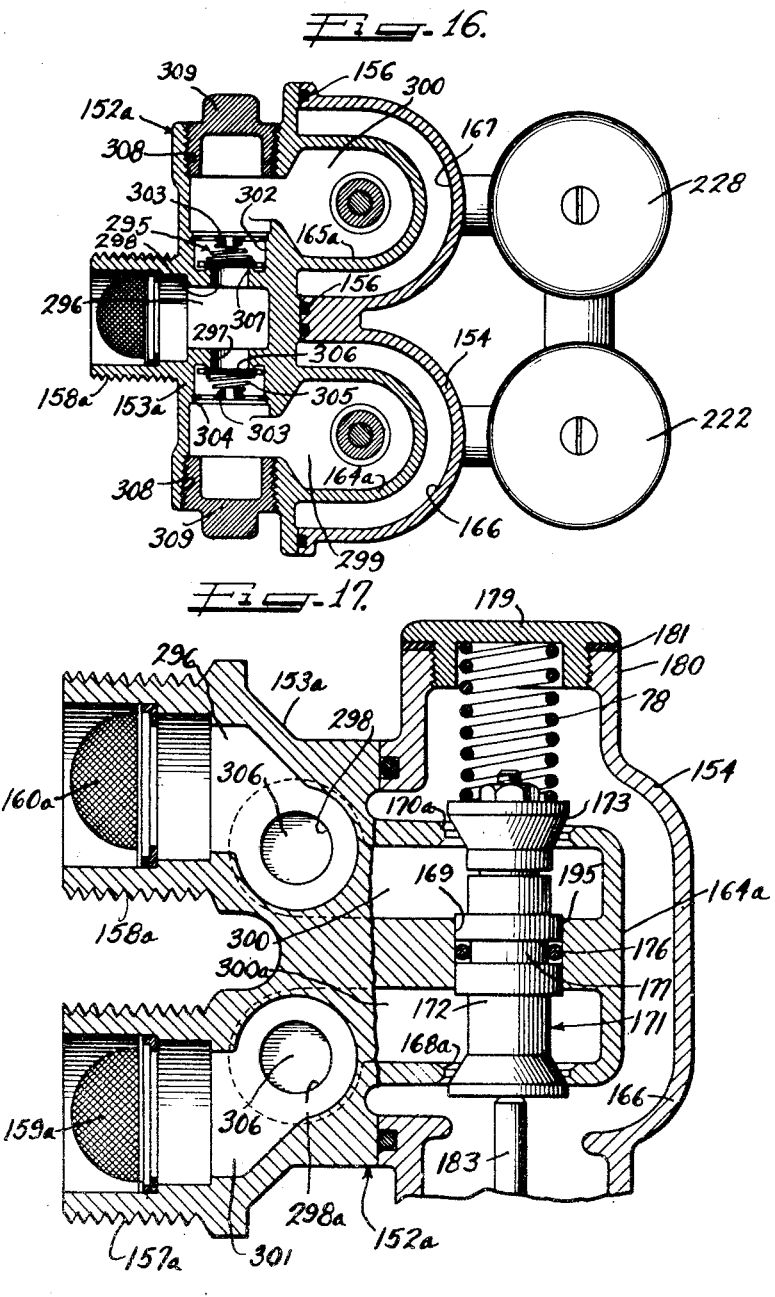

Patented Apr. 11, 1950

2,503,901

UNITED STATES PATENT OFFICE 2,503,901

FLUID CONTROL SYSTEM PARTICULARLY FOR USE WITH AUTOMATIC CLOTHES-WASHING MACHINES

Thomas B. Chace, Winnetka, Ill., assignor to The Dole Valve Company, Chicago, Ill., a corporation of Illinois Application December 9, 1943, Serial No. 513,610

13 Claims. (Cl. 68—12)

This invention relates to a fluid control system and more particularly to a system for selectively delivering a fluid at a plurality of predetermined selected temperatures.

In many fluid systems, such as the fluid system of an automatic washing machine, the temperature of the fluid supplied to the tub or receptacle is controlled and maintained by automatically proportioning the mixing of the fluid obtained from a hot and a cold fluid supply pipe so as to deliver fluid at some constant predetermined intermediate temperature. Where it is necessary to supply fluid of different temperatures at different stages of the cycle of operations, means have been provided in the past for changing the setting of the temperature responsive means which controls the proportioning of hot and cold fluid. Means have also been provided in the past for obtaining fluid of a different temperature from that set by the mixing device by by-passing at some stage in the cycle of operations either hot or cold fluid around the mixing device and subsequently mixing it with the mixed fluid coming from the mixing device.

The present invention relates to a third method and means for obtaining fluid of different temperatures at different stages of a cycle of operations.

More particularly, it is an object of this invention to provide a novel fluid control device and system.

It is a further object of the present invention to provide a single compact fluid control unit having a pair of automatic temperature-control mixing valves therein, both supplied from a common hot fluid duct and a common cold fluid duct.

Another object of the present invention is to provide a novel method and means for handling fluid.

Another and further object of the present invention is to provide a novel method and means for handling, metering and combining fluids of different temperatures.

Another and still further object of the present invention is to provide a novel fluid control unit including a pair of automatic temperature control mixing valves having different temperature settings, a pair of shut-off valves and a pair of constant flow maintaining devices.

The novel features which I believe to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 is a plan view of a fluid control device embodying the novel teachings of the present invention;

Figure 2 is an end view of the fluid control device shown in Figure 1;

Figure 3 is a vertical sectional view through the fluid control device as taken along the line III—III of Figure 1;

Figure 4 is a generally horizontal sectional view through the control device as taken along the line IV—IV of Figure 3;

Figure 5 is a vertical sectional view as taken along the line V—V of Figure 3;

Figure 6 is an enlarged sectional view of the shut-off valve and the constant flow maintaining device shown in Figure 3;

Figure 7 is a view of the cam disks which control the opening and closing of the shut-off valves of the fluid control device;

Figure 8 is a diagrammatic illustration showing the fluid control device connected to supply fluid to a tank and sequentially controlled by a timer;

Figure 9 is an end view of a modified form of fluid control device embodying the teachings of the present invention;

Figure 10 is a generally horizontal view partly in section of the fluid control device shown in Figure 9 as taken along the line X—X of Figure 11;

Figure 11 is a vertical sectional view through the control device as taken along the line XI—XI of Figure 10;

Figure 14 is a diagrammatic illustration of an apparatus embodying the fluid control device of the present invention which is adapted to be controlled by a timer to operate in accordance with any one of several different programs;

Figure 15 is an enlarged view of the cam disks for the timer unit of the apparatus of Figure 14 for operating the fluid control device;

Figure 16 is a horizontal section partly in elevation corresponding generally to that of Figure 10 illustrating another modification of the fluid control device of the present invention; and Figure 17 represents a section through the modified form fluid control device of Figure 16 corresponding generally to Figure 11 and having parts broken away.

Figure 13:
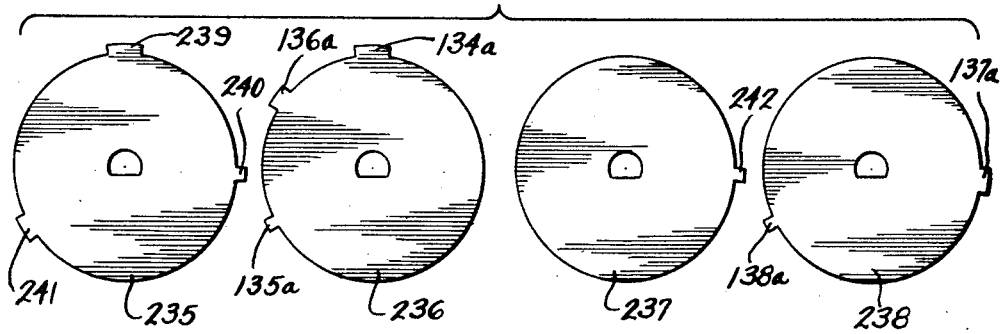
Figure 13 is a view of the cam disks for the timer unit of the assembly of Figure 12 to control the opening and closing of the shut-off valves of the fluid control device.

Referring now to Figures 1 to 8 of the drawings, there is illustrated therein one specific embodiment of a fluid control unit 21 which includes a pair of automatic temperature control mixer valves 22 and 23 and a pair of shut-off valves 24 and 25. The fluid control unit 21 includes a mixer valve housing unit 26, a pair of shut-off valve housing units 27 and 28, a delivery pipe Y 29 and an end plate 30 for the mixer valve housing unit 26 which is secured thereto.

The end member 30 is provided with a pair of externally threaded inlet nipples 31 and 32 which are arranged to be connected to a source of hot and cold fluid supply respectively. The nipples 31 and 32 open into inlet ducts 33 and 34 in the end plate. The inlet ducts 33 and 34 are flared in a horizontal plane as is clearly shown in Figure 4 of the drawings. The inlet duct 34 of the end plate 30 communicates with two inlet ducts 35 and 36 in the housing 26 which are associated respectively with the mixer valves 22 and 23. The inlet ducts 35 and 36 have a wall portion 37 therebetween which divides the stream of incoming fluid from the inlet duct 34 in the end plate 30. The hot fluid inlet duct 33 is similar to the cold fluid inlet duct 34 and communicates with two inlet ducts 38 and 39 (see Figure 5) in the housing member 26 associated with mixer valves 22 and 23 respectively.

A cap screen 40 is preferably provided in the inlet nipple 31 and a cap screen 41 is provided in the inlet nipple 32. As shown in Figure 3 of the drawings, a check valve assembly 42 is also provided in the hot fluid inlet nipple 31. As shown, this check valve assembly 42 includes a valve seat member 43 which is threaded into the inner end of the nipple as at 44, a valve 45, a spider 46 and a biasing spring 47. The spider 46 is seated on a shoulder 48 within the nipple 31. This check valve assembly 42 is arranged to prevent reverse flow of fluid back into the hot fluid supply line.

The end plate 30 may be secured to the housing member 26 in any suitable manner. As shown in Figures 1, 2 and 4 of the drawings, the end plate 30 is attached by a plurality of bolts 49, there being a suitable gasket 50 interposed between the end plate 30 and the housing member 26 to assure a fluid tight connection.

As has previously been explained, there are two mixer valve units embodied in the single flow control unit now being described as one embodiment of the present invention. Each of these mixer valve units communicates with the hot fluid inlet nipple 31 and each communicates with the cold fluid inlet nipple 32. The details of construction of the two mixer valve units are similar, and one of these structures will now be explained in detail.

Referring to Figure 3 of the drawings, the mixer valve unit 22 includes a valve member assembly 51. The valve member assembly 51 comprises a lower valve member 52 and an upper valve member 53 fitted over the upper end of the valve member 52. This enables the valve assembly 51 to be quickly and conveniently assembled within the housing 26. An intermediate portion 54 of the lower valve member 52 is slidably fitted through the intermediate partition wall 55. An annular recess 56 is provided in the surface of the intermediate portion 54 and a ring shaped washer of rubber or other yieldable material 57 is disposed in the recess to provide a packing ring around the intermediate portion 54 of the lower valve member 52. The lower end of the valve member 52 is provided with a tapered surface 58 which is arranged to be moved into and out of engagement with the valve seat 59 formed in the lower partition wall 60 of the housing member 26. The upper valve member 53 is similarly provided with a tapered surface portion 61 which is arranged to engage the valve seat 62 of the upper partition wall 63 of the housing 26.

When the upper valve member 53 is moved to such position that its tapered surface 61 is in tight engagement with the valve seat 62, the cold fluid inlet duct 35 is shut off from communication with the mixed fluid outlet duct 64 in the housing member 26. It will further be seen that when the upper valve member 53 is in its closed position the lower valve member 52 is in its open position and fluid from the hot fluid inlet duct 38 passes into the mixed fluid outlet duct 64. Likewise, the gradual opening of the cold fluid valve 61 and the gradual closing of the hot fluid valve 58 causes a varying proportion of hot and cold fluid to be mixed in the chamber 64.

The valve assembly 51 is normally biased in a downwardly direction by means of a biasing spring 65 which bears against the upper end of the valve assembly 51 and urges the tapered portion 61 against the valve seat 62. The lower end of the biasing spring 65 is seated in a recessed portion 66 of the upper valve member 53. The upper end of the biasing spring 65 is seated in the recessed portion 67 of a plug 68 which is threaded in a hollow boss 69 as clearly shown in Figure 3. A gasket or washer 70 is of course provided to make a fluid tight seal of the plug 68 with the boss 69.

The valve member 52 of the valve assembly 51 is provided with a relatively long bore 71 in which is disposed a spring 72. The upper end of the spring 72 is seated against the inner end of the bore portion 71 while the lower end of the spring 72 is seated against the head 73 of a pin 74 which extends entirely through the lower valve member 52. The upper end of the pin 74 is threaded and a nut 75 is secured thereon which is normally seated against the upper end of the valve member 52. The purpose of this spring 72 will presently be apparent, but it should be understood at this time that the spring 72 is relatively stiffer than the spring 65.

The automatic thermostatic means for controlling the position of the valve assembly 51 is mounted in the housing member 27. As illustrated in Figures 3 and 5 of the drawings, the thermostatic means is shown as a power element 76 having a lower shank portion 77 mounted for adjustable movement within a bore 78 in the lower housing member 27. The power element 76 also includes an upper thrust member 79 which bears against the head 73 of the pin 74 in the valve assembly 51. The details of construction of the power element 76 forms no part of the present invention, and for that reason has not been illustrated in detail in the present application. It will be understood, however, that the power element 76 may conveniently be a thermostatic element in which a change of phase occurs in the temperature sensitive material within the operating range of the device. By way of example and not by way of limitation, the power element may comprise a thermostatic element of the type illustrated and described in the Vernet et al. United States Letters Patent No. 2,259,846. For the purpose of understanding the present invention, it is sufficient to say that as the temperature of the mixed fluid flowing from the outlet duct 64 of the housing member 26 into the outlet duct 80 in the lower housing member 27 rises, the power element 76 will expand and cause the thrust member 79 to move upwardly as shown in Figure 3 of the drawings. This will cause the flow of hot fluid from the hot fluid inlet duct 38 into the mixed fluid chamber 64 to decrease in proportion to the flow of cold fluid from the cold fluid inlet duct 35 into the mixed fluid chamber 64. Similarly, as the temperature of the fluid flowing over the thermostatic power element 76 decreases, the power element will contract and the thrust element 79 will move downwardly, thus permitting the spring 65 to move the valve assembly 51 in a downward direction.

In view of the fact that many thermostatic power elements of the type which involve a change in phase of the temperature sensitive material creates a very sizable force, some means is necessary to prevent damage to the valve after the valve has been closed, should the power element continue to expand. This means is provided by the spring 72, for after the lower valve member 52 has caused its tapered portion 58 to be seated against the valve seat 59, continued movement of the power element 76 will merely compress the spring 72. In other words, continued movement of the power element 76 will cause relative movement of the pin 74 with respect to the valve member 52 after the valve has once closed.

In order to provide for temperature adjustment of the mixer valve, or, in other words, to provide a control for determining what the temperature of the mixed fluid shall be, the lower shank portion 77 of the power element 76 is adjustably mounted in the bore 78 of the lower housing member 27. More particularly, as shown in Figure 3 of the drawings, the lower end 81 of the shank portion 77 is threaded and provided with a nut 82. This lower end portion 81 extends through a plug 83 which is threaded into a boss 84. The lower shank portion 81 is provided with a collar 85 which is seated against a cup-shaped spring washer 86 seated within the recessed portion 87 of the plug 83. The portion of the shank 77 which passes through the bore 78 is provided with an annular groove 88 in which is seated a packing ring 89 of rubber or other suitable yieldable material.

The lower housing member 27 is bolted or otherwise suitably secured to the housing member 26 as at 90. A gasket 91 is preferably provided between the lower housing member 27 and the housing member 26.

The mixer valve unit 23 is similar to the mixer valve unit 22 and includes, in general, a valve assembly 92, a biasing spring 93 and a power element 94. The only essential difference between the mixer valve unit 23 and the mixer valve unit 22 is that the unit is set to maintain a different temperature of the mixed fluid.

The mixed fluid delivered from each of the mixer valves 22 and 23 is arranged to pass through a shut-off valve and a constant flow maintaining device which will now be described. In view of the fact that each of the shut-off valves and each of the constant flow maintaining devices are similar, only one will be described in detail.

Referring further to Figure 3 of the drawings, it will be seen that the mixed fluid outlet duct 80 extends into a chamber 95 in the lower housing member or casting 27. The casting 27 is provided with a portion 96 which projects into the chamber 95 and extends upwardly in the center portion thereof. The portion or center post 96 has a duct 97 therein which communicates with the main delivery duct 98 of the fluid control unit. The upper portion of the center post 96 is recessed as at 99 and provided with a shoulder 100 upon which is seated the constant flow maintaining device 101. This device 101 is in the form of a flat annulus formed of resilient material such as rubber.

The effective area of the passageway 102 through the rubber annulus 101 on the upper side thereof will vary depending upon the pressure differential across this member. In other words, as the pressure drop across the member 101 increases (i. e., as the pressure in the duct 80 increases with respect to the pressure in the delivery duct 98) the cross-sectional area of the passageway 102 at its upper surface decreases, as is clearly shown in Figure 6 of the drawings. This, of course, decreases the size of the orifice, and the pressure of the fluid increases. By properly cutting back the shoulder 100 as at 103 it has been found that the element 101 will cause equal quantities of fluid to be delivered in equal periods of time.

The element 101 is retained against the shoulder 100 by means of the lower shank portion 104 of the valve seat member 105 which is threaded into the upper end of the center post 96.

The valve seat member 105 includes an upper shank portion 106 which forms a valve seat for the shut-off valve which will now be described.

The shut-off valve which is described as being a preferred arrangement to be employed in the present invention is a shut-off valve of the so-called "pilot operated" type. This shut-off valve includes a flexible diaphragm 107 which is secured in the upper portion 108 of the casting 27 against a shoulder 109 by a cap 110. The central portion of the flexible diaphragm 107 is built up to form the valve portion 111 which is arranged to seat on the valve seat 106. More particularly, an eyelet 112 is formed into the center of the diaphragm 107 and a central aperture is provided through the element 112 and the diaphragm 107 through which fluid in the chamber 113 above the diaphragm 107 may be drained. This opening 114 through the diaphragm 107 and the element 112 is arranged to be closed by a plunger 115 which is associated with the electromagnet 116. The details of the electromagnet 116 are not necessary for an understanding of the operation and teachings of the present invention, it being sufficient to state that when the electromagnet 116 is energized through an electric circuit which is connected to its binding posts 117 and 118 (see Figure 1) the plunger 115 will be drawn up and away from the upper end of the passageway 114 and the diaphragm 107. Bleeder holes 119 are provided in the diaphragm between the central portion 111 and the outer portion of the diaphragm which is clamped to the shoulder 109 by the cap 110. It will thus be apparent that the upper chamber 113 is at all times in direct communication through these bleeder holes 119 with the fluid coming from the mixed fluid outlet duct 80. When the plunger 115 is in engagement with the diaphragm 107 to close the upper end of the passageway 114 the pressure exerted on the upper side of the diaphragm 107 will be that of the fluid in the duct 80, while the pressure exerted on the under side of the diaphragm 107 will be in part due to the pressure of the fluid in the duct 80 and partly due to the pressure in the chamber 120 above the constant flow maintaining device 101. Since the pressure in the chamber 120 is less than the pressure in the duct 80, there will be a pressure differential across the diaphragm 107 urging the valve to its closed position against the valve seat 106. On the other hand, when the plunger 115 is raised upon energization of the solenoid electromagnet 116, the pressure in the upper chamber 113 will drop due to the fact that it will now be in open communication with the chamber 120 which in turn is in communication with the main delivery duct 98. Due to the fact that the bleeder holes 119 are relatively small the pressure of the fluid in the duct 80 on the under side of the diaphragm 107 will cause the diaphragm to be raised to its position as shown in Figure 6 of the drawings. The fluid passing through the duct 80 will thus continue through the flow control device 101 into the main delivery duct 98.

In order to prevent fluid getting into the coil of the electromagnet 116, a shell 121 which is closed at its upper end (not shown) extends up into the core of the electromagnet 116. The shell 121 is provided with a lip 122 which is sealed in any suitable manner, such as by soldering or brazing, to the cap 110. A packing ring 123 is disposed in a recess 124 in the cap 110 to make a fluid tight connection between the shell 121 and the cap. A gasket 125 is also preferably provided between the cap 110 and the upper end of the portion 108 of the casting 27 to make a tight joint at this point.

The shut-off unit 25 and its associated constant flow maintaining device is the same as that above described in connection with the shut-off valve 24 and its associated flow control device. In this connection it will of course be understood that the main delivery duct 98 is in communication with both of the shut-off valves 24 and 25 and their associated flow control devices. As will be understood from an inspection of Figures 3 and 4 of the drawings, the Y-shaped member 29 is connected to the castings 27 and 28 in any suitable manner, such as by soldering or by a press fit.

One manner in which the fluid control unit 21 may be employed in connection with an automatic washing machine is illustrated on Figures 7 and 8 of the drawings. Referring first to Figure 8, the fluid control unit 21 is connected to a hot water supply hose 126 and a cold water supply hose 127. In this connection, it will be understood that the hot water supply hose 126 is connected to the nipple 31 while the cold water supply hose 127 is connected to the nipple 32. The main delivery duct 98 of the fluid control unit 21 is connected to a delivery hose or pipe 128 which leads into a tub or container 129 as diagrammatically indicated in Figure 8.

The solenoid 116 of the shut-off valve 24 and the similar solenoid 130 of the shut-off valve 25 are arranged to be energized and de-energized from a control circuit operated by a timer motor 131. The timer motor for the automatic washing machine includes a pair of timer disks 132 and 133 which are shown in detail in Figure 7. The timer disk 132 has three projections 134, 135 and 136 while the cam disk 133 has two projecting portions 137 and 138. The projecting portions 134, 135 and 136 on cam disk 132 are arranged to engage the cam follower 139 on the contact arm 140 to move the contact arm into engagement with a stationary contact 141 at all times when the cam follower is in engagement with any one of the raised portions 134, 135 or 136. Similarly, the cam follower 142 on a contact arm 143 is arranged to engage the projecting portions 137 and 138 on the cam disk 133. The contact arm 143 is arranged to be closed against a stationary contact 144 whenever the cam follower 142 is on one of the raised portions 137 or 138 of the cam disk 133. The two cam disks 132 and 133 are mounted on the rotating shaft 145 of the timer motor 131. The timer motor 131 may be one which causes continuous rotation of the shaft 145 or may be one which causes step by step rotation of the shaft 145.

An electric power supply circuit including conductors 146 and 147 is provided for energizing the timer motor 131 as well as the solenoids 116 and 130. The solenoid 116 is connected at one end to the power supply conductor 146. The other end of the solenoid or electromagnet 116 is connected through a conductor 148 to the stationary contact 141. The movable contact 140 is connected through a conductor 149 to the other power supply conductor 147. The solenoid or electromagnet 130 is connected at one end to the power supply conductor 146 and has its other end connected through a conductor 150 to the stationary contact 144. The movable contact 143 is connected through a conductor 151 to the other power supply conductor 147. It will thus be understood that whenever the movable contact 140 is closed against its associated stationary contact 141 the solenoid 116 is energized. Similarly, whenever the movable contact 143 is closed against its associated stationary contact 144 the solenoid or electromagnet 130 is energized.

The number, location and circumferential length of the raised portions on each of the cam disks 132 and 133 will be dependent upon when water is desired in the tub or container 129 and the temperature of the water desired.

For the purpose of illustrating the operation and teachings of the present invention, an arrangement has been shown for use in an automatic washing machine which requires a soaking of the clothes, a washing of the clothes, and two rinsings of the clothes. Any conventional mechanism may be employed for effecting the washing as diagrammatically indicated at 309 (Figure 8). This mechanism per se is not shown in detail for it forms no part of the present invention.

In an automatic washing operation it is usually considered desirable that the clothes shall be soaked at a relatively low temperature first, that they thereafter be washed at a higher temperature which in turn is followed by a first rinsing operation at a somewhat lower temperature and finally by a rinsing operation at substantially the same temperature as the original soaking operation. A fluid control system capable of carrying on a series of operations of this character is conveniently provided by the flow control unit and its associated control circuit described in the present application.

By way of example and not by way of limitation, the cams 132 and 133 are shaped to operate in an automatic washing cycle in which the following conditions prevail:

| Quantity Delivered | Step | Time (In. Min.) | Temp. | Percent of complete cycle | Degrees |
|---|---|---|---|---|---|
|  |  |  | Degrees |  |  |
| 9 Gal | Fill | 3 | 100 | 4.8 | 17.3 |
|  | Soak | 8 |  | 12.9 | 46.4 |
|  | Drain | 6 |  | 9.7 | 34.9 |
| 6 Gal | Fill | 2 | 140 | 3.2 | 11.5 |
|  | Wash | 20 |  | 32.3 | 115.2 |
|  | Drain | 4 |  | 6.5 | 23.4 |
| 6 Gal | Fill | 1 | 120 | 1.6 | 5.8 |
|  | Rinse | 4 |  | 6.5 | 23.4 |
|  | Drain | 4 |  | 6.5 | 23.4 |
| 6 Gal | Fill | 2 | 100 | 3.2 | 11.5 |
|  | Rinse | 4 |  | 6.5 | 23.4 |
|  | Drain | 4 |  | 6.5 | 23.4 |

Thus the raised portion 134 on the cam disk 132 subtends an angle of 17.3°, raised portion 135 subtends an angle of 5.8°, while raised portion 136 subtends an angle of 11.5°. The raised portion 137 on the cam disk 133 subtends an angle of 11.5° while the raised portion 138 subtends an angle of 5.8°. The raised portions 135 and 138 are so positioned as to cause their associated movable contacts 140 and 143 respectively to be closed at the same time.

In the above illustration of a typical type of operation, it is to be understood that the automatic temperature control mixer valve 22 is set to supply liquid at a lower temperature than the automatic temperature control mixer valve 23. It will further be understood that as the cycle of operations starts only the electromagnet 116 is energized due to the fact that there is a raised portion 134 on the cam disk 132 at this point, but there is no corresponding raised portion on the cam disk 133. For that reason the tub will be filled with water at the temperature of the water supplied from the automatic temperature control mixer valve 22. Let it be assumed that this temperature is set for 100°. Let it also be assumed that the mixer valve 23 is set for operation to deliver fluid at 140°. Since the only shut-off valve which is open during this initial stage of operation is the shut-off valve 24, water is supplied to the tub 129 at 100°.

After the clothes have been soaked for a desired period of time and the tub drained, the shut-off valve 25 is opened by the energization of the electromagnet 130. This causes the water to be introduced into the tub at 140°.

During the first rinsing operation, both of the electromagnets 116 and 130 are energized due to the closure of movable contacts 140 and 143 by the raised portions 135 and 138 and accordingly water is delivered to the tub at 120°. It will be observed that this is the mean value of the temperature coming from the two automatic temperature control mixer valves.

The final rinse operation is effected by supplying water only from the low temperature mixer valve unit since only electromagnet 116 is energized. Thus, for the second rinse operation water supplied to the tub 129 is at a temperature of 120°.

The quantity of water delivered to the tub at each filling operation is determined by the length of time the shut-off valve in the fluid supply line from each mixer valve is open. The amount of water introduced into the tub 129 will be very accurately determined due to the fact that the constant flow maintaining device associated with each shut-off device causes equal quantities of water to be delivered for equal periods of time.

Thus in the illustrated example referred to above, nine gallons of water are supplied to the tub 129 by maintaining the shut-off valve in the low temperature supply line open for three minutes (it being assumed that the constant flow maintaining device is arranged to deliver fluid at the rate of three gallons per minute). When the tub is being filled for the wash operation the shut-off valve in the high temperature supply line is kept open for two minutes, thus supplying six gallons of water to the tub. In filling the tub for the first rinse operation it will be remembered that both of the shut-off valves are open. By keeping these two shut-off valves open for one minute, six gallons of water is supplied to the tub 129 due to the fact that each supply line is delivering three gallons of water per minute. In filling the tub for the final rinse operation the shut-off valve in the low temperature supply line is kept open for two minutes thus supplying the tub with six gallons of water.

Another important feature of the present invention resides in the fact that the constant flow maintaining device, which in each case, may advantageously take the form of a rubber annulus 101 associated with each of the shut-off valves 24 and 25, insures the maintenance of a uniform temperature of the fluid mixture supplied by the unit. The flow control devices 101 associated with the shut-off valves 24 and 25 serve, in the manner previously described, to adjust the flow from each of the automatic temperature control mixer valves 22 and 23. When both of the shut-off valves 24 and 25 are open, any pressure drop occurring in the fluid streams supplied to the individual mixer valves 22 and 23 or arising from other sources causes the flow control devices 101 to operate automatically to adjust the rate of flow emerging from the shut-off valves. This adjustment of the flow prevents the occurrence of deviations in the relative quantities of the component fluid streams combined to form the output of the fluid control device.

Thus, it will be seen that although the flow from the mixer valves 22 and 23 may vary due to changes in pressure or other attendant causes, the output from each of the shut-off valves will be automatically regulated and, therefore, the same equal proportions of low temperature fluid and high temperature fluid combined to produce the medium temperature fluid must always result. Since the proportions of each component are maintained equal under all conditions, the resultant combination of these components must of necessity produce and constantly maintain a uniform temperature.

In Figures 9, 10 and 11 of the drawings I have illustrated a modified form of the present invention. As will be apparent from a cursory inspection of the drawings, however, the principal differences are structural rather than functional. For that reason only a brief description of the modified form of the invention is deemed necessary.

The fluid control device 152 illustrated in Figures 9, 10 and 11 includes a housing member 153 which is arranged to meet with the housing member 154 to form a closed unit for the two automatic temperatue control mixer valves. These two housing members 153 and 154 are bolted together as at 155, there being a gasket 156 disposed between the mating surfaces to provide a fluid tight connection. The housing member 153 includes two nipples 157 and 158 which are arranged to be connected to a hot fluid supply source and a cold fluid supply source respectively. Each of the nipples is provided with a screen 159 and 160 respectively and in addition the hot fluid nipple 157 is provided with a check valve assembly 161 of the type previously described in connection with the first embodiment of the invention. The nipple 157 opens into a hot fluid inlet duct 162 while the nipple 158 opens into a cold fluid inlet duct 163. The housing member 153 is also provided with a portion 164 and a second portion 165 which project into the chamber portions 166 and 167 of the housing member 154. The projecting portions 164 and 165 are provided with vertically aligned apertures 168, 169 and 170 through which the valve assembly 171 extends. The valve assembly, as described in connection with the first embodiment of the invention, includes a lower valve member 172 and an upper valve member 173 which is mounted on the lower valve member 172. The intermediate portion of the lower valve member 172 is provided with a shoulder or collar 175 which makes a sliding fit with the wall of the bore 169. A packing ring 176 is mounted in a recess 177 in the collar portion 175. A biasing spring 178 is provided in the upper part of the assembly and is arranged to bear against the valve assembly 171 at one end and agInst a cap 179 at the other end. The cap 179 is threaded into the upper portion 180 of the housing member 154, there being a gasket 181 provided to form a fluidtight seal. A thermostatic power element 182 is provided which is of the same general type as that referred to in connection with the first embodiment of the invention. This thermostatic power element 182 is provided with a thrust arm 183 which bears against the head 184 of the pin 185 of the valve assembly 171. As previously described the collar 184 of the pin 185 bears against a relatively stiff spring 186 which is retained in a well portion 187 of the lower valve member 172.

The power element 182 in this embodiment of the invention, is mounted in a somewhat different manner than that described in connection with the first embodiment of the invention. More particularly, a cup-shaped element 188 is seated in the chamber 189 against a shoulder 190. The side walls 191 of the cup-shaped member 188 are apertured as at 192 to permit fluid to flow therethrough. The cup-shaped element 188 is also provided with an upper plate 193 which is apertured as at 194 to permit fluid to flow into the cup-shaped member 188 from the mixed fluid outlet chamber 166. The power element 182 is disposed within the chamber formed by the cup-shaped member 188 and the plate 193. The arrangement of the apertures 194 and 192 is such as to cause the fluid passing from the mixed fluid outlet chamber 166 to flow over the power element 182 as it passes to the mixed fluid outlet duct 195.

The cup-shaped element 188 is tightly retained in place against the shoulder 190 by means of a threaded annular member 196 which is threaded into the lower recessed portion 197 of the housing member 154. This annular member 196 has a relatively large central opening 196' through which the lower shank portion 198 of the power element 182 projects. This shank portion 198 carries an end button 199 which is seated against the adjustable closure member 200 which is also threaded into the lower portion 197 of the housing member 154. This closure member 200 is provided with a recessed portion 201 in which a packing ring 202 is seated to provide a fluidtight connection betwen the closure element and the housing member 154.

The transverse partition 203 of the closure member 200 is provided with a boss 204 having a slot 205 therein for the reception of the screwdriver or other instrument for turning the same. It will readily be understood from the above description that the closure member 200 may be manually adjusted to vary the position of the power element 182 within the housing member 154. Since a variation in the relative position of the power element 182 varies the loading on the spring 178 it will be understood that the position of the power element 182 is a function of the temperature setting of the automatic temperature control mixer valve heretofore described.

The mixed fluid outlet duct 195 is connected to a shut-off valve and constant flow maintaining device 206 as is clearly shown in Figure 11 of the drawings. The shut-off valve and constant flow maintaining device includes a housing 207 in which a chamber 208 is arranged for direct connection with the mixed fluid supply duct 195. An intermediate partition 209 extends across the housing member 207 to form the lower wall of the chamber 208. A valve seat 210 is secured in a boss 211 in the wall portion 209. A flexible diaphragm 211 is secured within the housing 207 against a ring 212 which is seated on a shoulder 213. The diaphragm 211 is clamped in place by means of a cap 214 having a threaded shank portion 215 which bears against a metal clamping ring 216 on the upper marginal edge of the flexible diaphragm 211. The diaphragm is provided with an eyelet member 217 which is provided with a central aperture 218 to permit the passage of fluid from the chamber 219 above the diaphragm 211 into the chamber 220 on the under side of the partition wall 209. Bleeder holes 221 are provided in the flexible diaphragm to permit fluid to flow from the mixed fluid supply duct 195 into the upper chamber 219 above the flexible diaphragm 221. An electromagnet 222 is mounted above the housing 207 and includes a solenoid winding (not shown) and a movable armature or plunger 223 having a pointed lower end 224 which is arranged to extend into the upper end of the passageway 218 and close the same when the magnet is deenergized. Upon energization of the magnet 222 the plunger 223 is raised up into the core thereof and permits the fluid in the upper chamber 219 to drain into the chamber 220 and through a constant flow maintaining device 225 into an outlet nipple 226. The constant flow maintaining device 225 is similar in its construction to that described in connection with the first embodiment of the invention, and functions in the same manner. In this embodiment of the invention it will be noted that the outlet nipple or duct 226 is substantially at right angles with respect to the duct 195 which conducts fluid from the mixer valve into the shut-off valve.

A second mixer valve 227 is provided which is similar in structure to the mixer valve 152 and is also provided with an automatic constant flow maintaining device similar to the device 225 associated with the mixer valve 152. An electromagnet 228 is associated with the mixer valve 227 and is similar in function and operation to electromagnet 222 above described.

The mixer valve 227 is provided with an outlet nipple 229 which is similar to the outlet nipple 226. A Y-shaped delivery duct connection 230 is connected to the nipples 226 and 229 and is arranged to deliver fluid through a suitable delivery hose (not shown) connected to the common outlet delivery duct 231.

From the above description it will be seen that an extremely compact and economical fluid control system is provided for sequentially delivering a predetermined quantity of fluid at different selected temperatures.

Figure 12:
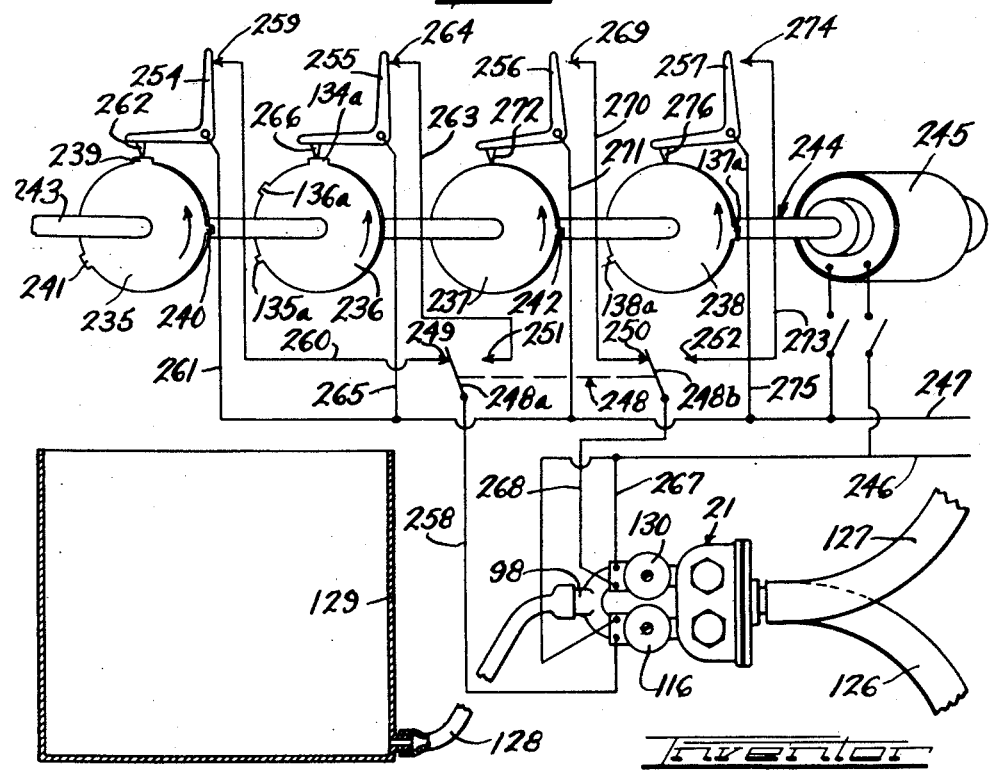
Figure 12 is a diagrammatic illustration showing an alternative embodiment of the invention in which the fluid control device sequentially controlled by a timer is adapted to supply fluid to a tank in accordance with varying conditions.

Attention is now directed to the electrical control circuit of Figure 12 illustrating the manner in which the fluid control devices of Figures 1 and 9 may be selectively operated to supply fluid to a system in accordance with varying conditions. The particular arrangement shown is advantageously adapted to be employed in supplying fluid to an automatic washing machine in which materials having different degrees of soil are to be laundered. By way of example, but in no sense of limitation, the control circuit of Figure 12 is adapted to selectively control one of the aforementioned fluid control devices in such manner that by simple manual adjustment the fluid control device will supply water of the proper temperature for laundering such articles.

It is highly desirable to take advantage of the flexibility of the apparatus of the present invention to the fullest extent possible in the interest of conserving the fluid for the control of which the system has been devised. In laundering operations generally, unlimited quantities of hot water are desirable but the water supply as well as the capacity of the heating equipment necessarily restrict its promiscuous use. Since most fabrics and garments, either by virtue of their physical characteristics or by reason of their being less dirty, will launder satisfactorily in water of somewhat lower temperature in the several washing steps than that necessitated by other types, they present the possibility of saving hot water. It is, therefore, the purpose to provide a control system subject to the selection of the operator and capable of operating the fluid control device which will provide water at the proper temperature for laundering each class of fabrics.

Such a control circuit may embody a timer unit having two sets of disks. One set controls the operation of the fluid control device in supplying water for the soak, wash and rinse cycles at temperatures in accordance with the laundering requirements for fabrics or garments which, by virtue of their being more difficult to launder, require hotter water for the washing and rinsing steps. The other set of controls is adapted to supply water for laundering fabrics which are somewhat less difficult to launder and, therefore, necessitate the use of cooler water. In Figures 12 and 13, cams 235 and 237 actuate the flow control device for lightly soiled or comparatively easy to launder articles while the cams 236 and 238, which are identical with cams 132 and 133 of Figures 7 and 8, are designed for operating the device to supply water for laundering heavily soiled or difficult to launder fabrics.

In the washing of the latter class of fabrics, the cams 236 and 238 being identical to the cams 132 and 133 provide an operating cycle for the fluid control device of the invention which is identical to that hereinbefore described. The first mentioned class of fabrics, however, are first soaked in water of low temperature, then washed at a medium temperature and finally rinsed in water at a temperature substantially the same as that employed in the original soaking operation. Consequently, much less hot water will be required in the performance of these operations than is the case with the previously described embodiment of the invention employing a single set of cams controlling the supply of water for heavily soiled fabrics.

In the control circuit of Figure 13, cams 235 and 237 for lightly soiled fabrics are advantageously shaped to operate in an automatic washing cycle in which the following conditions prevail.

| Quantity Delivered | Step | Time (in. min.) | Temp. | Per cent of complete cycle | Degrees |
|---|---|---|---|---|---|
|  |  |  | Degrees |  |  |
| 9 gal | Fill | 3 | 100 | 4.8 | 17.3 |
|  | Soak | 8 |  | 12.9 | 46.4 |
|  | Drain | 6 |  | 9.7 | 34.9 |
| 6 gal | Fill | 1 | 120 | 1.6 | 5.8 |
|  | Wash | 20 |  | 32.3 | 115.2 |
|  | Drain | 4 |  | 6.5 | 23.4 |
| 6 gal | Fill | 2 | 100 | 3.2 | 11.5 |
|  | Rinse | 12 |  | 22.5 | 82.1 |
|  | Drain | 4 |  | 6.5 | 23.4 |

Thus, the raised portion 239 on the cam disk 235 (Figure 13) subtends an angle of 17.3°, portion 240 subtends an angle of 5.8°, and portion 241 subtends an angle of 11.5°. The single raised portion 242 on disk 237 subtends an angle of 5.8°. Raised portions 240 and 242 are so positioned that they cause their associated contacts to be closed at the same time.

The raised portions 134a, 135a and 136a on cam disk 236 as well as the raised portions 137a and 138a on the cam disk 238 are identical in span and position to the correspondingly numbered portions on cam disks 132 and 133 in the timer unit illustrated in Figure 8. These disks provide an operating cycle for the fluid control device in accordance with the conditions prevailing in the previously discussed example associated with the description of Figures 7 and 8 and, by virtue of this fact, the operation thereof will not be explained in detail.

The cam disks 235 to 238, inclusive, are mounted on the longitudinal shaft 243 of a suitable conventional timer unit 244 and are rotated in the direction indicated by the arrows by means of the motor 245. Conductors 246 and 247 supply current to the timer 244 for energizing the timer motor 245 and solenoids 116 and 130 of the fluid control unit 21. As previously indicated, the operation of the timer 244 is determined by the manual operation of a selector switch 248 to provide a supply of water to the container 129 in accordance with the characteristics of the fabrics being laundered. The cycle of operations of the fluid control device 21 for supplying water for laundering lightly soiled fabrics will be performed when the switch arms 248a and 248b of the selector switch 248 are in contact with the fixed contact points 249 and 250, respectively. The operating cycle for the fluid control device 21 dictated by the heavily soiled and hard to launder fabrics will be set in motion when the switch arms 248a and 248b of selector switch 248 engage the fixed contact points 251 and 252.

Inasmuch as the portion of the present circuit embodying cam disks 236 and 238 and their associated movable contacts 255 and 257 corresponds to that illustrated in Figure 8 of the drawings already described, it is deemed to be sufficient only to trace the respective circuits in their turn without a detailed description of their operation.

The solenoid electromagnet 116 of the shut-off valve 24 is connected at one end to the power supply conductor 246. The other end of the electromagnet 116 is connected through a conductor 258 to arm 248a of selector switch 248. When the selector switch 248 is disposed in the position illustrated, contact is made between arm 248a thereof and stationary contact 249 which is connected with stationary contact 259 by conductor 260. The movable contact 254 associated with cam disk 235 completes the circuit from stationary contact 259 to the power supply conductor 247 through the conductor 261 when the follower 262 on the movable contact 254 encounters one of the several raised portions 239, 240 or 241 on the cam disk 235 as it is rotated by the shaft 243 actuated by timer motor 245.

It will be understood that when arm 248a of the selector switch 248 is in contact with stationary contact 251, the circuit will then be completed through conductor 263, fixed contact 264, movable contact 255 and conductor 265 to the power supply conductor 247. The cam follower 266 of the movable contact 255 will make or break contact between said movable contact and fixed contact 264 as it encounters or moves off the raised portions 134a, 135a or 136a of the cam disk 236.

The solenoid electromagnet 130 is connected at one side to the power supply conductor 246 by means of a conductor 267. The other side of the electromagnet 130 is connected by means of a conductor 268 to the arm 248b of selector switch 248. When the selector switch 248 is in the position illustrated, contact is made between arm 248b thereof and fixed contact 250 which is interconnected with stationary contact 269 as by means of conductor 270. The circuit is completed through the movable arm 256 and conductor 271 with power supply conductor 247 when the cam follower 272 of the movable arm 256 encounters the raised portion 242 on the associated cam disk 237 during its rotation by shaft 243 actuated by motor 245 of timer 244.

As before, when arm 248b of the selector switch 248 is in contact with fixed contact 252 the one side of the circuit through the electromagnet 130 including conductor 268 and arm 248b will then be completed through stationary contact 252, conductor 273, fixed contact 274, movable contact 257 and conductor 275 with the power supply conductor 247. The cam follower 276 for movable contact 257 will make or break contact between said movable contact and stationary contact 274 as it encounters or moves off the raised portions 137a or 138a of the cam disk 238.

In an automatic washing operation, it is, as previously indicated, the generally accepted practice to launder lightly soiled fabrics by subjecting them to a low temperature water for soaking, washing them in water of medium temperature and rinsing them in water at a temperature substantially the same as that employed in the soaking operation. The operator, therefore, sets the selector switch 248 in the position indicated in Figure 12 with arms 248a and 248b in contact with stationary contacts 249 and 250.

It will be remembered that the automatic temperature control mixer valve 22 of the fluid control device 21 is adapted to supply water at a lower temperature than that supplied by the like mixer valve 23 of the device 21. Thus, when the shut-off valve 24 controlled by the solenoid 116 is opened alone, mixed water at a low temperature, such, for example as approximately 100° F., will be supplied to container 129 through the connection 128. Likewise, when the shut-off valve 25 controlled by the solenoid 130 is opened alone, mixed water at a relatively high temperature such, for example as approximately 140° F. will be introduced to container 129. When both shut-off valves 24 and 25 are opened a uniform mixture of the two mixed water supplies will be furnished approximating a temperature of 120° F.

At the start of operations with the timer circuit as shown in Figure 12, the raised portion 239 of disk 235 is in contact with the follower 262 of the movable contact 254 and the circuit is closed through the solenoid 116 thereby causing the low temperature mixed water to be introduced to the tub or container 129 for the soaking operation for lightly soiled fabrics. It will be noted that the cooperating disk 237 has no correspondingly positioned raised portion on its periphery so that the solenoid 116 alone will be operated. Although the movable contact 255 associated with cam disk 236 is in contact with stationary contact 264, it will be understood that this will have no effect for the reason that the circuit is broken at the fixed contact 251.

The shut-off valve 24 will be held open for a period sufficient to supply the required quantity of water to the container 129 to fill it to the proper depth for soaking. According to the condition table for this example, approximately 9 gallons of water at 100° are supplied for the soaking operation. When the follower 262 of the movable contact 254 drops off the raised portion, the contact between said movable contact and its associated fixed contact 259 is broken thereby stopping the influx of water to the container 129.

After the material has been soaked for the required interval, the container 129 is drained. In the interim, the shaft 243 of the timer 244 has rotated to bring the raised portions 240 on cam disk 235 and 242 on cam disk 237 into engagement with the cam followers 262 and 272 of movable contacts 254 and 256, respectively, thereby making contact with their respective stationary contacts 259 and 269. Thus, the solenoids 116 and 130 will open shut-off valves 24 and 25 simultaneously introducing water at a medium temperature of 120° to the container 129. Since the volume of water for the washing operation is somewhat less than that required for the soaking operation (for example 6 gallons) and since both valves 24 and 25 are open at the same time, the raised portions 240 and 242 on cam disks 235 and 237 will be proportionately smaller than the portion 239 on disk 235.

As before, it will be understood that although the raised portion 137a on the cam disk 238 will cause the movable contact 257 associated therewith to close with stationary contact 274, it will have no effect due to the fact that the circuit therethrough is broken at the stationary contact 252.

Following the washing operation, the water is again drained from container 129. The rotation of shaft 243 of the timer 244 will now have brought the raised portion 241 on cam disk 235 into engagement with follower 262 on movable contact 254 causing it to close with the stationary contact 259 completing the circuit through the solenoid 116 as in the first instance. Again, there is no corresponding raised portion on the cooperating cam disk 237 so that only the shut-off valve 24 will be opened and mixed water at 100° F. will be introduced to the container 129 for the rinsing operation.

At the conclusion of the rinsing operation, the tub is drained again and the automatic washing machine will be ready for whatever further operations are to be performed. When the last operation is completed, the machine is usually automatically shut off and the attendance of the operator is again necessary before a new cycle of operations will be begun. The operator may, in his discretion, at this juncture reset the apparatus and change the position of the selector switch to proceed with the laundering of a charge of heavily soiled fabrics which brings the cams 236 and 238 into operation.

Since the selector switch 248 contacts the stationary contacts 249 and 250 and thereby breaks the circuit associated with the cam disks 236 and 238, the cooperating raised portions 135a and 138a will have no effect on the operation of the fluid control device 21 in spite of the fact that they close contact with the fixed contacts 264 and 274 as the shaft 243 rotates. Similarly, the raised portion 136a on cam disk 236 will not vary the operation of the device 21.

In the same way, when the selector switch 248 is reversed from the position illustrated in Figure 12 so that its arms 248a and 248b contact the fixed contacts 251 and 252, respectively, the cam disks 236 and 238 will thereafter be effective in completing the circuit in response to the operation of their associated movable contacts 255 and 257 as their cam followers 266 and 276, respectively encounter the raised portions on said disks. The cam disks 235 and 237 will be rendered ineffective in this arrangement by virtue of the fact that the contact between arms 248a, 248b of the switch 248 and contacts 249, 250, respectively, is broken.

The electrical control circuit of Figure 14 illustrates the manner in which the fluid control devices of Figures 1 and 9 may be selectively operated to supply fluid to a system in accordance with an even greater variety of conditions than the circuits of either Figure 8 or Figure 12. This circuit includes all of the control units and associated elements of both of the previously described circuits differing therefrom only in respect of the incorporation therein of certain additional features.

It is well known that woolen fabrics, for example, cannot be subjected to fluid temperature changes in the cleansing or laundering operations without resultant damages. Woolens cannot be safely laundered in water of exceedingly high temperature nor can they be subjected to water at low temperatures, the optimum results being obtained with water maintained at approximately 100° F. Thus, a complete cycle of operations for the laundering of woolens differs from that determined for both the lightly and heavily soiled fabrics in that the water employed for the soaking, washing and rinsing operations is preferably of approximately the same temperature throughout.

The new control circuit, as previously indicated, embodies the timer 244, the shaft 243 of which is rotated by the motor 245. A selector switch 280, which is adapted to be substituted for the switch 248 of the apparatus of Figure 12, differs therefrom in that it may be manually adjusted by the operator to a position such that it will cause the fluid control unit to deliver water for the several steps of the laundering operation for each of three different classes of articles to be laundered, namely, heavily soiled, lightly soiled or woolen fabrics.

Thus, the pointer associated with switch arm 280a may be positioned by the operator opposite the designation H on scale 281 when heavily soiled fabrics are to be laundered and the cams 236 and 238 will direct the operation of the fluid control unit 21 to deliver water to the container 129 in accordance with the conditions set forth in the first example relative to the design of cams 132 and 133 of Figure 8. When the pointer is selectively positioned opposite the designation M on scale 281, the cams 235 and 237 will direct the operation of the fluid control unit 21 to supply water in the washing cycle for lightly soiled fabrics in accordance with the conditions of the second example hereinbefore described in detail.

In the control circuit of Figure 14, the single cam 282 is adapted to direct the operation of the fluid control device 21 for supplying water for the several steps of soaking, washing, spray rinsing and rinsing. The cam 282 is advantageously shaped to operate in an automatic washing cycle in which the following conditions prevail:

| Quantity Delivered | Step | Time (in min.) | Temp. | Percent of complete cycle | Degrees |
|---|---|---|---|---|---|
|  |  |  | Degrees |  |  |
| 9 gal | Fill | 3 | 100 | 4.9 | 17.6 |
|  | Soak | 8 |  | 13.0 | 46.8 |
|  | Drain | 6 |  | 9.8 | 35.1 |
| 6 gal | Fill | 2 | 100 | 3.2 | 11.5 |
|  | Wash | 20 |  | 32.5 | 115.2 |
|  | Drain | 4 |  | 6.5 | 23.4 |
|  | Spray | 0.5 | 100 | 0.8 | 2.9 |
| 6 gal | Fill | 2 | 100 | 3.2 | 11.5 |
|  | Rinse | 12 |  | 19.5 | 72.6 |
|  | Drain | 4 |  | 6.5 | 23.4 |

The raised portion 283 on the cam disk 282 (Figure 15) subtends an angle of 17.6°, portion 284 subtends an angle of 11.5°, portion 285 subtends an angle of 2.9° and portion 286 subtends an angle of 11.5°. Only one cam disk is required to fulfill the conditions of the above example for the reason that all of the water supplied by the fluid control device 21 is at 100° F. for each of the steps in the operating cycle for the laundering of woolens. This cycle will be followed when the pointer of the arm 280a is positioned opposite the designation W on scale 281.

Since the electrical circuit associated with the several cams 235, 236, 237 and 238 is unchanged from that shown and described in connection with Figure 12 of the drawings, it is deemed unnecessary to repeat a detailed description of the operation thereof. It will be understood, however, that the operation of the cams 235 to 238, inclusive, will be determined by the selective positioning of selector switch 280 by the operator. That is to say, when switch arms 280a and 280b are in contact with fixed contacts 251 and 252, respectively, and the pointer is at H, the cams 236 and 238 only will control the operation of fluid control device 21. Likewise, when selector switch 280 is in contact through its arms 280a and 280b with fixed contacts 249 and 250, and the pointer is at M, the fluid control device 21 will be controlled only by cams 235 and 237.

With the selector switch 280 in the position illustrated in Figure 14 having the pointer located at W and switch arm 280a in contact with fixed contact 287 while switch arm 280b is free, the cam 282 will control the operation of the fluid control device 21. It will be understood that the electrical circuits associated with the several cams 235 to 238, inclusive, will be broken, when the selector switch 280 is in the position illustrated, since the circuits emanating from fixed contacts 249 to 252, inclusive, and associated with said cams are not completed through the selector switch 280.

After the operator has set the selector switch 280 and the motor 245 of the timer 244 is connected into the circuit from the power supply conductors 246 and 247 by actuating the double poled switch therebetween, the shaft 243 on which the several cams 235 to 238, inclusive, and 282 are mounted is rotated by motor 245.

At the beginning of operations, the movable contact arm 288 is in contact with its fixed contact 289 by reason of the fact that its cam follower 290 is positioned on the raised portion 283 on cam 282. As a result, an electrical circuit is completed. The one side of the solenoid electromagnet 116 is connected directly to the power supply conductor 246. The other side of the solenoid electromagnet 116 is connected through the conductor 258, switch arm 280a of the selector switch 280, fixed contact 287, conductor 291, fixed contact 289, movable contact arm 288 and the conductor 292 with the other power supply conductor 247.

When the solenoid electromagnet 116 is energized by the closing of the circuit in the manner just described, the shut-off valve 24 of the fluid control device 21 opens admitting mixed water from the automatic temperature control mixer valve 22 at a lower temperature (approximately 100° F.) to the container 129 through the connection 128.

By virtue of the fact that only one cam 282 is employed for the control of the water supply for the laundering of woolens, only the solenoid electromagnet 116 will be operated since all of the water supplied to the container 129 for accomplishing the several steps in the complete cycle of operations is not to vary from a temperature of 100° F. As each of the raised portions 283, 284, 285 and 286 of the cam disk 282 register, due to the rotation of the shaft 243 of timer 244, with the cam follower 290 of the movable contact arm 288 the same electrical circuit as that above outlined will be completed to energize the solenoid electromagnet 116.

It will be noted that the raised portion 285 of cam disk 282 is somewhat smaller than the others. This raised portion 285 controls the operation of the fluid control device to deliver water for a period of approximately 30 seconds to introduce water to the container 129 to perform a spray rinse operation. The purpose of this step which is advantageously introduced following the completion of the washing step and prior to the actual rinsing operation is to wash through the machine the surplus suds and scum left behind when the container 129 is drained. Since the pump continues to operate during this cycle it is preferable to limit the duration of the step to a period of 15 to 30 seconds for the conservation of hot water.

Following the completion of the final rinse operation in the cycle, the machine is ready to be emptied and a new batch of laundry placed therein. The selector switch 280 may then be set for supplying water in accordance with one of the other sets of conditions or for a repetition of the same cycle, as desired.

It will be understood that the timer unit 244 may embody any desired combination or arrangement of cam disks to accomplish and number of different cycles of operation of the fluid control device 21. The addition of further sets of cams and the use of a suitable selector switch is all that is required to render the apparatus more completely universal. It is apparent also that a spray rinse step may be readily incorporated in any one of the several sets of conditions previously described.

The fluid control device 152a of Figures 16 and 17 while substantially similar to that of Figures 9, 10 and 11, differs therefrom chiefly in the construction of the housing member 153a which, as we have seen, cooperates with the housing member 154 to form a closed unit for the two automatic temperature control mixer valves. As before, the nipples 157a and 158a are adapted to be connected to the hot fluid supply source and the cold fluid supply source, respectively, being provided with screens 159a and 160a, respectively.

All of the elements of the structure associated with the mixer valves disposed in the housing member 154 correspond exactly with those of the unit of Figures 9, 10 and 11 previously described, wherefore, this description will be principally concerned with the construction of housing member 153a. The housing member 153a of fluid control device 152a differs from housing member 153 of device 152 by reason of the incorporation therein of the check valve assemblies 295. A pair of such assemblies is associated with each of the nipples 157a and 158a as indicated in Figure 16 to prevent short-circuiting of the fluid from one of the temperature control mixer valves to the other.

As will best be seen from Figure 16, each nipple serves to supply fluid to both mixer valve units. Here nipple 158a which is connected to the cold fluid supply source communicates directly with an internal chamber 296. A pair of ports 297 and 298 which are advantageously formed in two opposite walls of the chamber 295 provide a connection between said chamber and cold fluid inlet ducts 299 and 300, respectively, in the portion 164a of housing member 153a.

In similar fashion the nipple 157a which is connected to the hot fluid supply source communicates directly with an internal chamber 301 formed in the housing member 153a adjacent the internal chamber 296 for nipple 158a. As in the case of the chamber 296, the chamber 301 is provided with ports 297a and 298a corresponding to ports 297 and 298 (298a only being seen in Figure 17). The ports 297a and 298a provide a connection between the internal chamber 301 and hot fluid inlet ducts 299a and 300a of which only the latter is seen in Figure 17 but which are advantageously identical to the corresponding counterparts above described.

One of the check valve assemblies 295 is disposed adjacent each of the ports 297, 298, 297a and 298a to prevent cross communication between the adjoining inlet ducts 299 and 300, as well as 299a and 300a, respectively. This arrangement is particularly advantageous in such instances as, for example, when only one of the mixer valve units is supplying fluid to the outlet for the fluid control device. More specifically, a possibility of cross communication of the fluid supplies may be presented when the shut-off valve for one of the mixer valve units is open and the shut-off valve for the other of said mixer valves is closed.

Each of the check valve assemblies 295 is disposed in a counterbore 302 at one end of each of the several ports 297, 298, 297a and 298a. The assembly 295 includes a spider 303 disposed in a shoulder 304 cut in the counterbore 302, a biasing spring 305 and a valve 306. The valve 306 which advantageously takes the form of a thin disk or plate is urged against a raised annular seat 307 provided in the base of each bore 302.

To provide access to the interior of the inlet ducts 299, 300, 299a and 300a a plurality of threaded openings 308 are formed in the wall of the housing member 153a. The openings 308 are advantageously disposed in said member 153a at points directly opposite each of the several counterbores 302 therewithin to afford an opportunity of assembling and disassembling the several check valve assemblies 295.

The operation of this modified embodiment of the fluid control device 152 of the invention is identical with that previously described. The check valves 295 operate in the conventional manner to admit fluid in one direction through the associated port but to prevent the fluid from passing therethrough in the opposite direction. This counterflow of fluid might conceivably result from the creation of a pressure differential between inlet ducts 299 and 300, for example, when one mixer valve operates to deliver fluid while the outlet from the adjacent mixer valve is closed during one of a series of operations directed by the electrical control means or timer previously described and in accordance with a selected program.

The fluid control system and the fluid control device of the present invention are especially advantageous in that they are exceedingly flexible and may be selectively operated in accordance with any one of several sequences of operating steps to handle fluid. As we have seen, the manual shifting of a simple selector switch is all that is required on the part of the operator to fit the operation to the desired conditions.

In the application of the inventive concept to the automatic washing machine, the present invention conserves hot water by tempering only the precise quantity necessary with low temperature water. It further enables the use of the correct minimum temperature water required to obtain maximum washability of the particular class of fabric being laundered. The flow control feature of the fluid control device conserves the amount of water employed by supplying it at a uniform rate regardless of variations in pressure at the source.

While I have shown particular embodiments of my invention, it will, of course, be understood that I do not wish to be limited thereto, since many modifications may be made, and I therefore contemplate, by the appended claims, to cover all such modifications as fall within the true spirit and scope of my invention.

I claim as my invention:

1. A fluid control device including a pair of housing members secured together to form a unit, one of said members having a head portion projecting into the interior of said unit, said head portion being shaped to form two pairs of upper and lower inlet chambers, the upper and lower chamber of each pair being substantially vertically aligned, said projecting head portion forming with one of said housing members a pair of separate fluid mixing chambers, said head portion having ports communicating one of said mixing chambers with the upper and lower chambers of one of said pairs and having a second set of ports communicating the other of said mixing chambers with the upper and lower chamber of the other one of said pairs, one of said housing members having a pair of fluid inlet ducts, one of said fluid inlet ducts being connected to both of said upper chambers and the other of said fluid inlet ducts being connected to both of said lower chambers, and a pair of thermoresponsive mixer valves mounted in said unit and arranged to control the proportioning of fluid from each of said pairs of upper and lower chambers through their associated ports to deliver fluid to their respective associated mixing chambers at predetermined temperatures.

2. A fluid control device including a pair of housing members secured together to form a unit, one of said members having a head portion projecting into the interior of said unit, said head portion being shaped to form two pairs of upper and lower inlet chambers, the upper and lower chamber of each pair being substantially vertically aligned, said projecting head portion forming with one of said housing members a pair of separate fluid mixing chambers, said head portion having ports communicating one of said mixing chambers with the upper and lower chambers of one of said pairs and having a second set of ports communicating the other of said mixing chambers with the upper and lower chamber of the other one of said pairs, one of said housing members having a pair of fluid inlet ducts, one of said fluid inlet ducts being connected to both of said upper chambers and the other of said fluid inlet ducts being connected to both of said lower chambers, a mixer valve mounted in the ports of one pair of upper and lower inlet chambers, a second mixer valve mounted in the ports of the other pair of upper and lower inlet chambers, a pair of fluid temperature responsive power elements mounted to respond to the fluid temperatures in the two mixing chambers respectively and connected to said mixer valves to control the proportioning of fluid delivered to the two respective mixing chambers from their associated inlet chambers, a pair of outlet fluid conducting members mounted on said housing unit and communicating with the mixing chambers, a shut-off valve in each of said conducting members to selectively stop the flow of fluid therethrough from the associated mixing chamber, and a constant flow maintaining device in each of said conducting members to maintain equal delivery of fluid in equal periods of time irrespective of variations in fluid pressure.

3. A fluid control unit including a housing member having a pair of spaced vertically extending tubular chambers, there being a pair of relatively large openings on one side of the housing opposite each of said chambers, a second housing member having a pair of projecting heads and having a horizontally extending partition forming an upper and lower chamber in each head and in the main body portion thereof, said heads projecting into the two tubular chambers respectively of said first housing member and forming therewith separated and isolated fluid mixing chambers, the openings in said first housing member being closed off by said second housing member, said second housing member having an inlet duct communicating with both of said upper chambers, and a second inlet duct communicating with both of said lower chambers, each of said heads having aligned openings through their respective top and bottom walls and intermediate partitions, a mixer valve assembly mounted in each set of openings, a thermo-responsive element mounted in each tubular chamber connected with said mixer valves respectively to move the same in response to temperature changes of the fluid passing thereby, said first housing member having a fluid outlet connection from each of said tubular chambers and a common delivery duct directly attached to said fluid outlet connections.

4. A fluid control unit including a housing member having a pair of spaced vertically extending tubular chambers, there being a pair of relatively large openings on one side of the housing opposite each of said chambers, a second housing member having a pair of projecting heads and having a horizontally extending partition forming an upper and lower chamber in each head and in the main body portion thereof, said heads projecting into the two tubular chambers respectively of said first housing member and forming therewith separated and isolated fluid mixing chambers, the openings in said first housing member being closed off by said second housing member, said second housing member having an inlet duct communicating with both of said upper chambers, and a second inlet duct communicating with both of said lower chambers, and a thermo-responsive fluid mixing valve mounted in each head.

5. A fluid control device including a housing member having top, bottom, back and side walls, a second housing member secured to said first member to form a unit, said first member having a head projecting back into the interior and spaced from the outer walls thereof, said head being connected to the rear wall of said first housing member by a vertically disposed partition, said first housing member including said head and said partition forming two fluid mixing chambers, the interior of said head being shaped and constructed to provide two pairs of upper and lower inlet chambers, the upper and lower chamber of each pair being substantially vertically aligned, said head having ports communicating one of said mixing chambers with the upper and lower chambers of one of said pairs and having a second set of ports communicating the other of said mixing chambers with the upper and lower chamber of the other one of said pairs, said second housing member having a pair of fluid inlet ducts, one of said fluid inlet ducts being connected to both of said upper chambers and the other of said fluid inlet ducts being connected with both of said lower chambers, a mixer valve mounted in the ports of one pair of upper and lower inlet chambers, a second mixer valve mounted in the ports of the other pair of upper and lower chambers, and a pair of fluid responsive power elements mounted to respond to the fluid temperatures in the two mixing chambers respectively and connected to said mixer valves to control the proportioning of fluid delivered to the two respective mixing chambers from their associated inlet chambers.

6. A fluid control device including a pair of housing members secured together to form a unit, one of said members having a head portion projecting into the interior of said unit, said head portion being shaped to form two pairs of upper and lower inlet chambers, the upper and lower chamber of each pair being substantially vertically aligned, said projecting head portion forming with one of said housing members a pair of separate fluid mixing chambers, said head portion having ports communicating one of said mixing chambers with the upper and lower chambers of one of said pairs and having a second set of ports communicating the other of said mixing chambers with the upper and lower chamber of the other one of said pairs, one of said housing members having a pair of fluid inlet ducts, one of said fluid inlet ducts being connected to both of said upper chambers and the other of said fluid inlet ducts being connected to both of said lower chambers, a mixer valve mounted in the port of one pair of upper and lower inlet chambers, a second mixer valve mounted in the port of the other pair of upper and lower inlet chambers, a pair of fluid temperature responsive power elements mounted on said unit in position to respond to the fluid temperatures in the two mixing chambers respectively and connected to said mixer valves to control the proportioning of fluid delivered to the two respective mixing chambers from their associated inlet chambers, and adjustable means for independently changing the relative position of either of said power elements with respect to said head portion, thereby to vary the temperature of the mixed fluid in the respective mixing chambers.

7. A fluid supply system for an automatic washing machine or the like comprising a hot fluid supply, a cold fluid supply, a container, a dual mixer valve unit which produces by proportioning of the hot and cold fluids at least two mixtures thereof of different temperatures, a conduit connecting the mixer valve unit to the container, means for directing each of the fluid mixtures to said conduit, independently operable means controlling the flow of each of the fluid mixtures into the conduit, a timer for operating the control means according to a plurality of different predetermined operating cycles to deliver each of the fluid mixtures individually and in combination to the conduit and the container depending upon the stage in the operating cycle of the machine, and a selector switch for selecting an operating cycle for the timer without necessitating any alteration in the temperatures of the mixtures of fluid produced by the mixer valve unit.

8. A fluid supply system for an automatic washing machine or the like comprising a hot fluid supply, a cold fluid supply, a container, a dual mixer valve unit which produces by proportioning of the hot and cold fluids at least two mixtures thereof of different temperatures, a conduit connecting the mixer valve unit to the container, means for directing each of the fluid mixtures to said conduit, independently operable means controlling the flow of each of the fluid mixtures into the conduit, a timer for operating the control means to deliver each of the fluid mixtures individually and in combination to the conduit and container depending upon the operation to be performed therein, said timer including a plurality of sets of timer disk elements which determine different operating cycles for the control means, and a selector switch for selecting that set of cycle determining elements which will direct the operation of the control means in accordance with the conditions attending the use of the fluid system.

9. A system for supplying water to the container of an automatic washing machine or the like employed in laundering articles having different physical characteristics comprising a hot water supply, a cold water supply, a mixer valve unit which proportions and mixes the hot and cold water to form at least two mixtures thereof having different predetermined temperatures, independently operable control means for controlling the supply of each mixture to the container, a timer for operating the control means to deliver each mixture individually or in combination to the container, said timer having a plurality of sets of cam disks for actuating the control means according to a predetermined schedule to produce optimum laundering conditions for several classes of articles to be laundered, and a selector switch for positioning the cam disks of the timer to direct the operation of the control means according to a particular schedule which is in keeping with the class of articles to be laundered.

10. A fluid supply system for an automatic washing machine or the like comprising a hot fluid supply, a cold fluid supply, a container for receiving said fluid, a fluid control device for supplying mixtures of the fluids of a plurality of predetermined temperatures to said container, said fluid control device embodying a pair of temperature controlled mixer valves each of which is provided with a shut-off valve and a means for controlling the flow from each mixer valve, said last means communicating with a common delivery duct for delivering fluid to the container, and a selector switch for selectively operating the fluid control device in accordance with one of a plurality of predetermined temperature set cycles.

11. A fluid supply system for an automatic washing machine or the like comprising a hot fluid supply, a cold fluid supply, a container, a dual mixer valve unit which produces by proportioning of the hot and cold fluids at least two mixtures thereof at different temperatures, check means for each mixer valve to prevent cross flow of the hot and cold fluid supplies, a conduit connecting the mixer valve unit to the container, means for directing each of the fluid mixtures to said conduit, independently operable means controlling the flow of each of the fluid mixtures into the conduit, a timer for operating the control means to deliver each fluid mixture both separately and in combination to the container in accordance with at least two different predetermined operating cycles, and a selector switch for selecting the desired operating cycle for the timer.

12. A fluid supply system for an automatic washing machine or the like comprising a hot fluid supply, a cold fluid supply, a container for receiving said fluid, a fluid control device for supplying mixtures of the fluids of a plurality of predetermined temperatures to said container, said fluid control device embodying a pair of temperature controlled mixer valves each of which is provided with a shut-off valve and a flow control device communicating with a common delivery duct for delivering fluid to the container, a selector switch for selectively operating the fluid control device in accordance with one of a plurality of predetermined temperature set cycles, and means coacting with each of the mixer valves to prevent cross flow of the hot and cold fluid supplies whenever the shut-off valve for only one of said mixer valves is operated by the selector switch to deliver a single mixture to the container.

13. In apparatus for washing fabrics, the combination of a container for water and the fabrics to be treated, means for washing the fabrics within the container, and means for admitting water at different temperatures to the container, said last-mentioned means including sources of cold and hot water, first and second water mixing devices connected to said sources and having respective chambers in which the hot and cold water are mixed, means responsive, respectively, to the temperatures of the mixed water in said chambers for controlling the flow of hot and cold water thereto, first and second valves for controlling the discharge of water from the respective chambers, means defining a compartment for receiving the water discharged by the valves, means for conveying the water from the compartment to said container and means for operating said valves.

THOMAS B. CHACE.

REFERENCES CITED

The following references are of record in the file of this patent:

UNITED STATES PATENTS

| Number | Name | Date |
| --- | --- | --- |
| 421,057 | Schuberth | Feb. 11, 1890 |
| 467,883 | Haythorn | Jan. 26, 1892 |
| 1,076,293 | Lawler | Oct. 21, 1913 |
| 1,545,938 | Bren | July 14, 1925 |
| 1,836,797 | Harter | Dec. 15, 1931 |
| 1,954,261 | Pierce | Apr. 10, 1934 |
| 1,985,929 | Jorgensen | Jan. 1, 1935 |
| 2,055,031 | Hutchings | Sept. 22, 1936 |
| 2,110,952 | Glenn | Mar. 15, 1938 |
| 2,146,929 | Bassett | Feb. 14, 1939 |
| 2,197,294 | Brockbank | Apr. 16, 1940 |
| 2,288,141 | Oliver | June 30, 1942 |
| 2,296,266 | Breckenridge | Sept. 22, 1942 |
| 2,313,928 | Dyer | Mar. 16, 1943 |
| 2,321,573 | Chace | June 15, 1943 |

OTHER REFERENCES

Powers, pages 1–8, inc. of Bulletin No. 258–H, published June 1939 by the Powers Regulator Co., 2720 Greenview Ave., Chicago, Ill.